June 24, 1930.    E. R. MARBACH    1,767,184

ORNAMENTAL PROP DEVICE

Filed April 4, 1928

Inventor

EDWARD R. MARBACH

By Frank D. Gray, Attorney

Patented June 24, 1930

1,767,184

UNITED STATES PATENT OFFICE

EDWARD R. MARBACH, OF CLEVELAND, OHIO

ORNAMENTAL PROP DEVICE

Application filed April 4, 1928. Serial No. 267,264.

This invention relates to ornamental prop devices. These devices ordinarily comprise a bolt and nut member, and a hollow cap element mounted fixedly upon the end of the nut, the cap member being formed of metal capable of receiving a high polish or a coating which will render it ornamental, the outer surface of the cap being especially prominent and concealing more or less the bolt upon which it is carried.

It is the function of the nut when actuated by a wrench, to rotate the bolt which is used for securing an imitation folding top hinge upon a suitable support in the top frame of an automobile. Heretofore, the nut has ordinarily been manufactured as a separate piece from the threaded bolt, the bolt being first secured to the frame, and the nut being fixed upon the cap is later applied to the mounted bolt. It is an object of my invention to provide the nut member integral with the bolt and fixedly secure the cap to the nut before the bolt is attached to the frame.

It is a further object of my invention to stamp the outer and inner cup members of the cap independently, mount the inner cup member upon the end of the bolt projecting somewhat beyond the polygonal head, apply a reinforce member within the inner cup and subsequently press the outer cup member while inverted into telescopic engagement with the inner cup member by means of a pair of cup shaped dies, until the annular edge of the inner cup engages the reinforce.

These and other objects I attain by means of a construction embodying the features recited in the claims, and hereinafter described, and illustrated in the accompanying drawings, in which—

Figures 8 and 9 illustrate the last step of a method of manufacturing my device.

Figure 6:
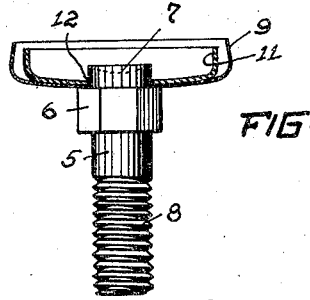
Figure 6 is a view similar to Fig. 1, but showing the lower cup members loosely assembled, and the outer cup member not yet applied.
Figure 2:
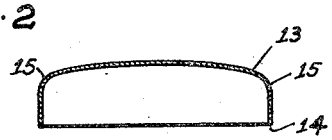
Figure 2 is a vertical section of the outer cup member.
Figure 5:
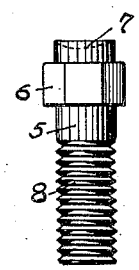
Figure 5 is an elevation of the bolt member.

Great difficulty has been experienced in stamping at reasonable cost of manufacture, a product that closely approximates the finished combined cap and bolt which I have here disclosed. Some of this difficulty has arisen from the inherent weakness in the base parts of the cap for opposing the forcing of the upper and outer cup member downward and against the base carried by the head of the bolt. I have overcome this difficulty by performing the stamping operations in connection with a bolt 5, such as shown in Figs. 5 and 6, being in one integral part having an enlarged bolt head 6 integral therewith, an upwardly extending, plain cylindrical portion 7, and the ordinary oppositely directed threaded end 8.

The enlarged portion 6 provides, therefore, a shoulder both above and below the same, the upper shoulder serving to receive the lower cup portions of the cap when assembled thereon. For this purpose, a flanged cup 9 having a central opening 10 is seated upon the portion 7, after which a slightly reduced cup member 11 having a similar central opening 12, is superposed upon the larger cup and concentric therewith, in the manner disclosed in Figs. 6 and 9. This additional cup member 11 is provided for serving to perform the operation which is an important feature of the present invention.

Figure 7:
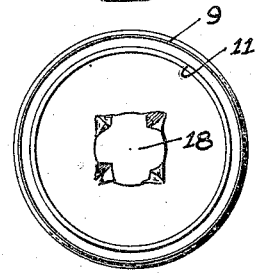
Figure 7 is a plan view of the parts shown in Fig. 6, after the cups have been secured to the bolt.
Figure 3:
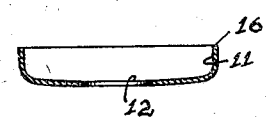
Figures 3 and 4 are vertical sections of the reinforced cup and the lower cup member, respectively.
Figure 4:
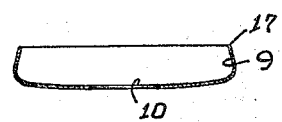

The final cup is applied to the members 9 and 11 which have been secured in fixed relation to the cylindrical portion 7, by a die-pressing operation which will be explained in detail later. After the members 9 and 11 have been mounted loosely upon the portion 7, in the manner shown in Fig. 6, the said cylindrical portion 7 is forced down upon the inner portions of the central edges of the members 9 and 11 about the openings 10 and 12, until the said members are securely riveted in position about the head 7, in the manner clearly shown in Figs. 1, 7 and 9.

Figure 1:
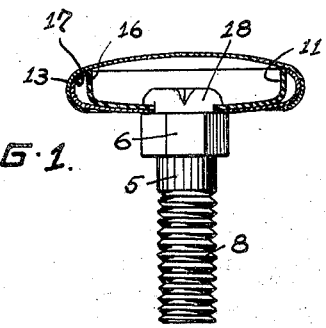
Figure 1 is a side elevation of my complete device, the cap member being shown in central vertical section.
Figure 8:
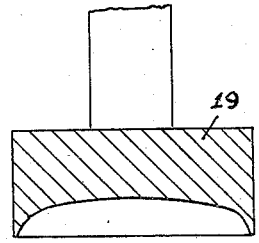
Figure 8 shows a section of one of the dies for shaping the product.
Figure 9:
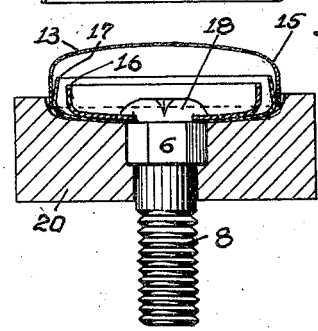
Figure 9 shows the assemblage of the parts in position in the lower apertured die prior to the swaging operation.

So far as described and shown, the cup member 9 serves to form the lower portion of the cap and the cup member 11 functions to make possible the attachment of the upper and lower members in opposed and telescopic relation, the beginning of this operation being indicated in Figs. 8 and 9, and the final product resulting from such operation being shown in Fig. 1.

The final or outside cup member is designated 13 and is sufficiently large to enclose the peripheral flanges of the inner cups at the time that it is first applied in the manner shown in Fig. 9. The operation from this point forward is quite novel. In the beginning of the closing action of the die blocks, the reduced portion 7 having first been upset, as shown at 18, to firmly secure the cups 9 and 11 upon the bolt, the upper die 19 contacts the upper and outer cup member 13 pressing it toward the lower die 20 until the peripheral edge 14 of the cup 13, having enveloped the flange of the cup 9, engages the inner surface of the die 20, after which further descent thereagainst, urges the said outer edge 14 to turn downwardly and inwardly about the cup 9 until the outer surface of the cup 13 at about the annular position 15 where the flange connects with the main body portion of the cup 13 strikes the edge 17 of cup 9, after which such member 13 will tend to bend the outer edge 17 of the cup 9 inwardly and toward the peripheral edge 16 of the flange of the cup member 11.

It is to be noted especially that the flange of the cup 11 is materially shallower than the flange of cup 9. This permits bending the flange of cup 9 before the outer cup 13 may contact the inner or reinforcing cup 11, so that the entire pressing or stamping operation may be completed without bending the flange of the cup 11. When, therefore, the stamping operation is complete, the outer edge 16 of the flange of the innermost cup member 11 will serve two purposes, that of bracing the hollow cap against internal collapse by reason of the close contiguity of the edge 16 with the inner surface of the cup 13; and second, that of receiving thereagainst the inner curved edges 17 of the flange of the cup 9 at the close of the operation. It is especially evident, that, since the reinforce cup 11 is riveted in position upon the cup 9 before the stamping operation begins, the reinforce 11 serves further to hold the lower cup 9 in position while the flange of the latter is being overturned inwardly into the position shown in Fig. 1. In other words, the reinforce cup member 11 serves as a brace member for the final product, as well as for the elements being operated upon in the several steps of the method of stamping.

It is to be emphasized that the reinforce member 11 is not changed in contour during the operation of effecting the final article. It is of the identical size and shape at the completion of the final product shown in Fig. 1, that it is when the first step of the method is effected. It has however, a particularly valuable set of functions in the operation of the manufacturing steps. The cups 9 and 11 are very securely fastened to the bolt by the upsetting of the portion 7, and the outer cup 13 is fixed to the cup 9 by the stamping operation, so that in the die pressing method, the cap as a unit, is fixed to the bolt, and the cap and bolt are together subject to rotation by the rotation of the bolt head 6. This latter advantage is the special result obtained by my invention, though the effecting of great strength of the final product results without injuring the ornamental character of the cap.

The initial inturning of the edge 14 of the flange of the cup 13 is attained by a downward pressure of the block 19 contacting the cup 13, first at the points 15, carrying the cup 13 down until the flange of cup 13 engages the flange of cup 9 and the resulting bending of the latter begins and continues while the lower edge 14 striking the block 20 and curving inward and under the cup 9. In the meantime, the brace member 11 opposes the rising tendency of the flat portion of the cup member 9, only permitting curving of the flange portion of cup 9 beyond the outline of the flange of cup 11.

My invention not only affords the advantages of ornamentation and securety of attachment of the parts in the final product, but it also makes certain a more artistic and finished, hollow cap when the operations are complete. The curved, telescopic engagement of the flanges of the parts 9 and 13 is especially perfect and smooth by this method and resulting in this product enclosing the inner cup 11.

Having thus described my invention, what I claim as new and desire to secure by Letters Patent is—

A device as specified comprising a bolt having an integral enlarged polygonal head portion and an upper plain cylindrical reduced part and an oppositely directed reduced threaded end, the polygonal head portion providing upper and lower shoulders on the bolt, and a cap for the bolt, said cap comprising an outer lower cup member seated on the upper shoulder and having a central aperture receiving said plain cylindrical part of the bolt therethrough, a reduced and apertured lower cup member seated in the outer cup member over the plain cylindrical part of the bolt, said cylindrical plain part of the bolt being swaged against said lower cup members for holding the same on the bolt, and an upper cup member seated on the lower outer cup member and having its peripheral flange telescoping and rounded with the peripheral flange of the lower outer cup member to interlock the cup members together and with the top of the upper cup member seated against the upper edge of the inner lower cup member to reinforce the cap.

In witness whereof I have hereunto set my hand this 31st day of March, A. D. 1928.

EDWARD R. MARBACH.